US012154025B1

United States Patent
Savic et al.

(10) Patent No.: US 12,154,025 B1
(45) Date of Patent: Nov. 26, 2024

(54) OPTIMIZATION OF GRAPHICS PROCESSING UNIT MEMORY FOR DEEP LEARNING COMPUTING

(71) Applicant: EMC IP Holding Company LLC, Hopkinton, MA (US)

(72) Inventors: Dragan Savic, Brookline, MA (US); Junping Zhao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 1487 days.

(21) Appl. No.: 15/895,642

(22) Filed: Feb. 13, 2018

(51) Int. Cl.
*G06N 3/063* (2023.01)
*G06F 3/06* (2006.01)
*G06N 3/04* (2023.01)
*G06N 3/084* (2023.01)
*G06T 1/20* (2006.01)

(52) U.S. Cl.
CPC ........... *G06N 3/063* (2013.01); *G06F 3/0608* (2013.01); *G06F 3/0659* (2013.01); *G06F 3/0661* (2013.01); *G06N 3/04* (2013.01); *G06N 3/084* (2013.01); *G06T 1/20* (2013.01)

(58) Field of Classification Search
CPC .... G06F 3/0608; G06F 3/0659; G06F 3/0661; G06N 3/04; G06N 3/063; G06N 3/084; G06T 1/20
See application file for complete search history.

(56) References Cited

U.S. PATENT DOCUMENTS

| 10,229,356 | B1 * | 3/2019 | Liu | G10L 15/16 |
| 2013/0093779 | A1 * | 4/2013 | Lyons | G06T 1/60 |
| | | | | 345/555 |
| 2015/0199963 | A1 * | 7/2015 | Maaninen | G10L 15/16 |
| | | | | 704/232 |
| 2018/0033116 | A1 * | 2/2018 | Tian | G06F 8/36 |
| 2018/0189642 | A1 * | 7/2018 | Boesch | G06N 3/084 |
| 2018/0248562 | A1 * | 8/2018 | Redfern | G06F 17/16 |

(Continued)

OTHER PUBLICATIONS

Han, S. et al., "Deep Compression: Compressing Deep Neural Networks with Pruning, Trained Quantization and Huffman Coding", Conference Paper for ICLR 2016 (Year: 2016).*

(Continued)

*Primary Examiner* — Alexey Shmatov
*Assistant Examiner* — Devika S Maharaj
(74) *Attorney, Agent, or Firm* — Ryan, Mason & Lewis, LLP

(57) ABSTRACT

Systems and methods are provided for optimizing GPU memory allocation for high-performance applications such as deep learning (DL) computing. For example, a DL task is executed using GPU resources (GPU device and GPU memory) to process a DL model having functional layers that are processed in a predefined sequence. A current functional layer of the DL model is invoked and processed using the GPU device. In response to the invoking, a data compression operation is performed to compress data of a previous functional layer of the DL model, and store the compressed data in the GPU memory. Responsive to the invoking, compressed data of a next functional layer of the DL model is accessed from the GPU memory and a data decompression operation is performed to decompress the compressed data for subsequent processing of the next functional layer of the DL model by the GPU device.

20 Claims, 6 Drawing Sheets

(56) References Cited

U.S. PATENT DOCUMENTS

| | | | | |
|---|---|---|---|---|
| 2018/0300246 A1* | 10/2018 | Sakthivel | ............. | G06N 3/0445 |
| 2018/0322386 A1* | 11/2018 | Sridharan | ................. | G06F 9/54 |
| 2019/0066257 A1* | 2/2019 | Daga | .................... | H04N 19/436 |
| 2019/0190538 A1* | 6/2019 | Park | ........................ | G06N 3/084 |
| 2019/0197420 A1* | 6/2019 | Singh | ...................... | G06F 17/16 |
| 2019/0206090 A1* | 7/2019 | Ray | ........................ | G06F 12/023 |
| 2019/0228284 A1* | 7/2019 | Holland | ................. | G06N 3/047 |

OTHER PUBLICATIONS

Cheng, Y. et al., "A Survey of Model Compression and Acceleration for Deep Neural Networks", IEEE Signal Processing Magizine (Year: 2017).*

Chen, W. et al., "Compressing Convolutional Neural Networks" (Year: 2015).*

Rhu, M. et al., "Compressing DMA Engine: Leveraging Activation Sparsity for Training Deep Neural Networks" (Year: 2017).*

Mohan, M. et al., "Novel Pipelined Neural Network Architecture for Image Compression and Decompression in terms of Low Power and Optimized Area", https://ieeexplore.ieee.org/abstract/document/7603030 (Year: 2016).*

Jafri, S. et al., "MOCHA: Morphable Locality and Compression Aware Architecture for Convolutional Neural Networks", https://ieeexplore.ieee.org/abstract/document/7967117 (Year: 2017).*

Minsoo Rhu et al., "vDNN: Virtualized Deep Neural Networks for Scalable, Memory-Efficient Neural Network Design," 49th IEEE/ACM International Symposium on Microarchitecture (Micro-49), 2016, 13 pages.

* cited by examiner

OPTIMIZATION OF GRAPHICS PROCESSING UNIT MEMORY FOR DEEP LEARNING COMPUTING

FIELD

This disclosure relates generally to techniques for accelerated data processing in a high-performance computing environment.

BACKGROUND

Various types of special-purpose processors, such as graphics processing units (GPUs) for general purpose computing and other types of hardware accelerators, have been developed for accelerated processing of specific types of workloads. The processing capabilities of GPU devices and other types of hardware accelerators are currently being utilized in various applications to accelerate the processing of highly-parallelized computational workloads in various technical fields. In particular, general-purpose computing on GPU (GPGPU) is utilized for high-throughput, accelerated processing of compute kernels for workloads (e.g., vector-based computations, matrix-based computations, etc.) that exhibit data-parallelism. For example, GPUs are used to accelerate data processing in high-performance computing (HPC) and embedded computing systems, for various applications such as financial modeling, scientific research, machine learning (ML), deep learning (DL), data mining, video data transcoding, image analysis, image recognition, virus pattern matching, augmented reality, encryption/decryption, weather forecasting, big data analytics and comparisons, and other applications with computational workloads that have an inherently parallel nature.

A distributed computing environment which comprises a large scale of shared computing resources over a cluster of computing nodes is typically utilized to support emerging applications such as big data analytics and deep learning applications. Indeed, deep learning applications, for example, require the collection, storage, and processing of a significantly large amount of data, wherein the data includes training data to build and optimize deep learning models, as well as model parameters of the deep learning models which are utilized for inference processing. Implementing an efficient distributed computing environment for these types of applications is not trivial as the intensive computational workloads, and the massive volume of data that must be stored, streamed, prefetched, and coordinated between the shared computing resources of the distributed computing platform presents a significant challenge and practical limit on system performance and scalability.

SUMMARY

Illustrative embodiments of the invention include methods for optimizing GPU memory allocation for high-performance applications such as deep learning computing. For example, one embodiment includes a method which comprises executing a deep learning task using GPU resources on a computing node, wherein the GPU resources comprise at least one GPU device and GPU memory, and wherein the deep learning task is executed using a deep learning model comprising a plurality of functional layers that are processed in a predefined sequence, wherein executing the deep learning task comprises: invoking a current functional layer of the deep learning model, and processing the current functional layer by the at least one GPU device; responsive to the invoking of the current functional layer, performing a data compression operation by the at least one GPU device to compress data of a previous functional layer of the deep learning model, and storing the compressed data of the previous functional layer in the GPU memory; and responsive to the invoking of the current functional layer, accessing compressed data of a next functional layer of the deep learning model from the GPU memory and performing a data decompression operation to decompress the compressed data for subsequent processing of the next functional layer by the at least one GPU device.

Other embodiments of the invention include, without limitation, systems and articles of manufacture comprising processor-readable storage media, which are configured to optimize GPU memory allocation for high-performance applications such as deep learning computing.

DETAILED DESCRIPTION

Figure 1:
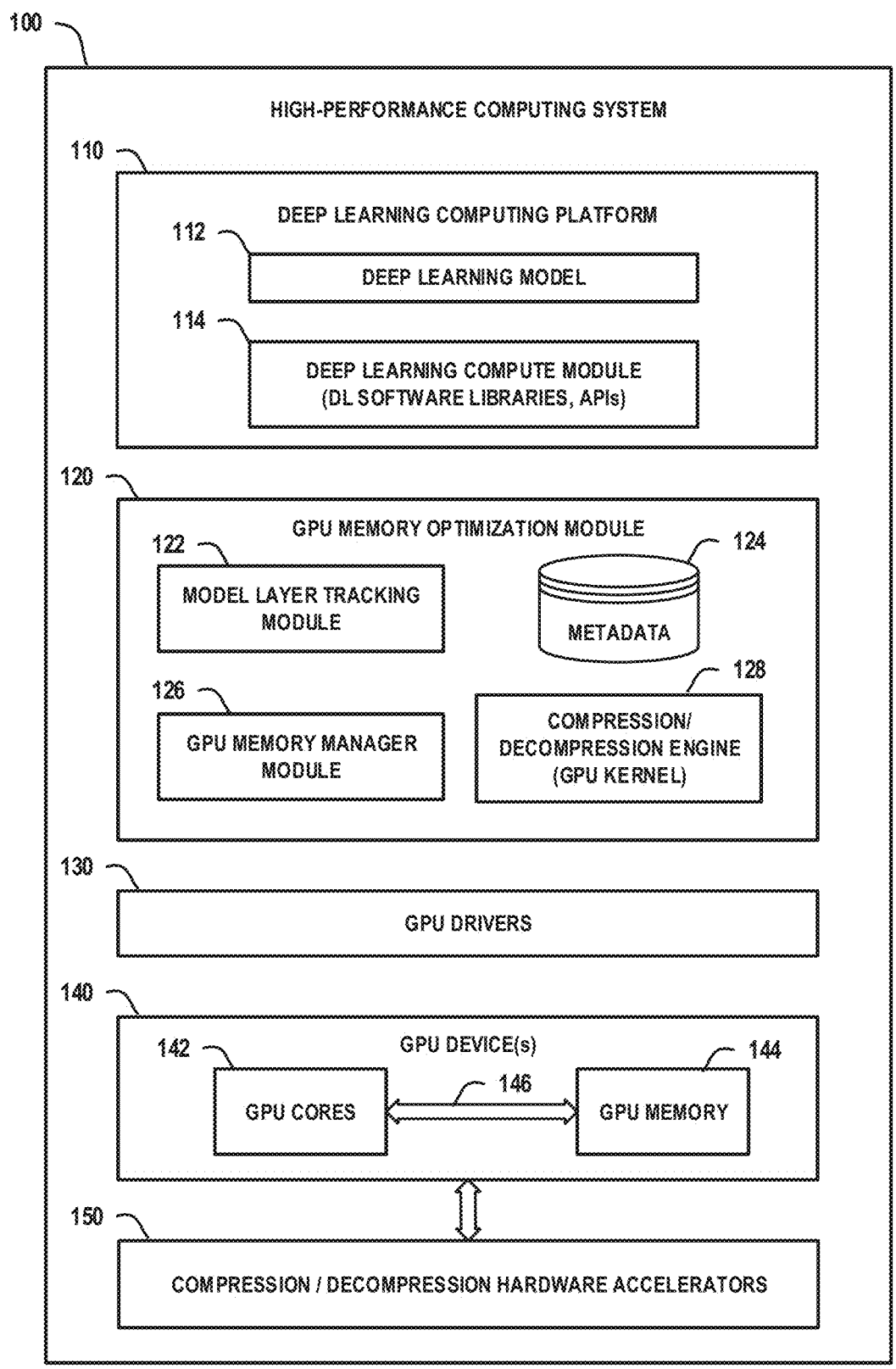
FIG. 1 is a high-level schematic illustration of a computing system which is configured to optimize GPU memory allocation for high-performance computing, according to an embodiment of the invention.

Illustrative embodiments of the invention will now be explained in further detail with regard to systems and methods for optimizing GPU memory allocation for high-performance applications such as deep learning computing. As explained in further detail below, embodiments of the invention provide systems and methods for GPU memory optimization by utilizing dynamic GPU memory allocation and data compression/decompression protocols to effectively decrease the GPU memory usage and bandwidth for high-performance computing. While the exemplary GPU memory optimization techniques discussed herein can be implemented with various types of applications that utilize GPU resources for accelerated data processing, for illustrative purposes, exemplary embodiments of the invention will be discussed in the context of deep learning (DL) applications, which require a significant use of computing resources (e.g., processor, memory, storage, and networking resources), and the communication of large amounts of data over internal system busses.

Deep learning (DL) application are typically utilized in machine learning applications for pattern recognition, image processing, and other artificial intelligence applications. DL applications can utilize Deep Neural Networks (DNNs), wherein a DNN comprises a feedforward artificial neural network with multiple hidden layers. A convolutional neural network (CNN) is one class of DNN which is commonly applied for analyzing images. A CNN comprises a sequence of functional layers including an input layer, an output layer, and a plurality of hidden layers between the input and output layers. The functional layers include, but are not limited to, convolutional layers, pooling layers, fully connected layers, normalization layers, etc.

A convolutional layer applies a "convolution operation" to an input dataset, and passes the processing results to the next layer in the network. As is known in the art, a convolutional layer applies filters (alternatively referred to as neurons or kernels) across all regions of an input dataset, wherein each filter is spatially smaller than the full volume of the input data set. The filters of a convolutional layer each comprise a set of learnable parameters (or weights), which are learned using a model training process. A convolutional layer utilizes a set of filters to perform a forward pass through an input dataset, wherein each filter slides (or convolves) across the width and height of the input volume and computes dot products between the entries of the filter and the input data at any position (i.e., receptive field). Each filter of the convolution layer will generate a 2-dimensional activation map (or feature map) which comprises the responses of the given filter at each spatial position (i.e., receptive field) of the input dataset. In essence, the convolution layer computes an output of neurons which are connected to corresponding local regions in the input data.

A pooling layer can be disposed between successive convolutional layers. In general, a pooling layer performs a down-sampling operation along spatial dimensions of the output data (e.g., feature map) of a convolution layer, which serves to reduce an amount of parameters and computation in the CNN and, thus, controls overfitting. In essence, a pooling layer combines the outputs of neuron clusters at one layer of the CNN into a single neuron in a next layer of the CNN. A pooling layer can reduce the spatial dimensions of a feature map using different methods known in the art including, but not limited to, MAX pooling, average pooling, L2-norm pooling, etc. For example, a MAX pooling operation applies a filter of size 2×2, for example, and a stride of the same length, and applies the filter to the input volume and outputs the maximum number in every subregion that the filter convolves around, thereby discarding 75% of the activations. In this regard, MAX pooling utilizes a maximum value from each of a cluster of neurons at the prior layer. An average pooling operation determines an average value from each cluster of neurons at the prior layer.

A fully connected layer is a final layer of the CNN, wherein the neurons in a fully connected layer are fully connected to all activations in a previous layer (e.g., convolution layer, pooling layer, etc.). The fully connected layer takes an input volume from a previous layer (e.g., activation maps of high level features), computes class scores for each class that the CNN is trained to classify, and outputs an N-dimensional vector, wherein N is a number of classes that the CNN is trained to classify. Each number in the N-dimensional vector represents the probability of a certain class.

DNN processing is a both computing heaving and memory intensive, requiring a significant amount of computing resources and memory usage. The chip architecture, cores and memory interfaces of state of the art GPU devices are suitably optimized for processing highly parallel computational tasks and workloads, such as DNN processing. While current generation GPU devices are built with high bandwidth memory interfaces (e.g., second generation High Memory Bandwidth (HBM2)), which provide sufficient memory bandwidth for processing DNN workloads, such GPU devices have relatively limited GPU memory capacity. In particular, high-speed integrated on-chip GPU memory size in current generation GPU devices is relatively small, e.g., typically a few GBs up to 16 GB, and such GPU memory size is not likely to be significantly increased in the near future due primarily to hardware manufacturing limitations. In this regard, GPU memory capacity is not commensurate with the increasing demand for high performance computing applications such as DNN processing and other DL processing workloads.

For example, a DL training process to train a DL model is a compute intensive task that requires the loading of mini-batch samples on worker server nodes, and performing repeated iterations (forward and back-propagation) on the mini-batch dataset using computing resources (on GPU, CPU, or other types of processors) until error conditions are met. Depending on the application, a given training dataset for training a DL model can on the order of terabytes (TB) in total size. Although DL training can be performed iteratively by loading and processing mini-batch data samples of training data (i.e., portions of the training data), the mini-batch data samples for certain training datasets (e.g., genetic data, high-resolution medical images, etc.) can be large enough to easily consume giga-bytes (GBs) of memory, exceeding the amount of GPU memory in current generation GPU devices. For DL applications, the limited memory of current generation GPU devices prevents the loading of large samples, setting larger sizes or mini-batch datasets, or developing deeper models. Embodiments of the invention address this problem by maximizing existing GPU memory to store more data.

One solution to address the limited GPU memory for DL computing using GPU devices is to implement a model-parallel programming model for DL computing, as opposed to a data-parallel programming model for DL computing. In particular, with model parallelism, a given DL model (parameter set) is split among different GPU devices, wherein the executing tasks on each of the GPU devices operate on different portions of the model (e.g. different model layers) using the same mini-batch dataset. For example, each layer in a neural network can be assigned to a different GPU device, so that each GPU device performs computations in different portions of the same model. The processing results from each GPU device are communicated to a parameter server, for example, wherein the processing results are synchronized to update a set of globally shared parameters.

On the other hand, with data parallelism, each GPU device has access to a complete copy of a given deep learning model, but each GPU device operates on a different portion of the overall dataset, wherein the computation results from each GPU device are combined by a parameter server. For neural networks, data parallelism involves each executing thread using the same weights (model parameters), but with each executing thread processing different mini-batches of data, wherein processing results (e.g., gradients) are synchronized (e.g., averaged) after each processing iteration of a mini-batch dataset.

One problem with utilizing a model-parallel framework is that most DL applications are built on a data-parallel framework, wherein model parallelism is currently much less mature than data parallelism. As such, developers would have to change the DL model paradigm to model-parallel framework to made more efficient use of GPU memory in current generation GPU devices. Moreover, a model-parallel framework requires more GPU resources (and therefore increases monetary cost), as well as computational complexity due to, e.g., the required communication across sub-models, and limited performance scaling due to the extra synchronization needed.

Another solution to address the limited GPU memory for DL computing using GPU devices is to swap data to system memory (or CPU memory) such as a dynamic random-access memory (DRAM)), which is typically much larger in size than the GPU memory, and then prefetch the data from the system memory (e.g., CPU memory) to the GPU memory on the fly. For DL applications, various phases of data movement involve coordinating the preloading of data (e.g., training datasets) or parameters (e.g., model weights) into memory (e.g., host memory, GPU memory, etc.). For example, various phase phases of data movement include (i) preloading data from a storage node (e.g., hard disk drive) and staging the data into a local file system or system memory and (ii) DMA loading or coping the data into a GPU memory for processing by a GPU device. In one embodiment, data movement operations are performed using DMA operations for local data movement between GPU devices or between a NVMe and GPU on a given node, or RDMA operations for inter-node data movement between, for example, a CPU and GPU located on different server nodes. Moreover, a typical process flow involving a CPU and GPU can include, for example, (i) loading data from main memory to GPU memory, (ii) the CPU directing the GPU to commence processing of the data, (iii) the GPU executing the data in parallel in two or more GPU cores, (iv) the GPU storing the processing results in the GPU memory, and (v) transferring the processing results from the GPU memory to the main memory.

The process of swapping (exchanging) data between the system memory and the GPU memory requires a relatively significant amount of CPU-GPU communication, which can overload an internal system bus (e.g., PCIe bus), consume a significant amount of power due to DMA operations, and consume CPU resources (such as pinning the memory for DMA), etc. Indeed, the frequent data swapping of large amounts of data between a CPU and GPU requires large data movement across a PCIe bus, an internal CPU bus/fabric, and a CPU DRAM bus, which consumes a lot more power as compared to GPU computing and local GPU-HBM2 data load/store operations. The increased communication between a CPU and a GPU to coordinate data swapping operations can adversely impact other operations such as normal data feeding. Furthermore, while the number of GPU floating point operations per second ("FLOPS") of current generation GPU devices continues to increase, the technological advances for internal buses (e.g., PCIe) are evolving much slower, so the gap between number of GPU FLOPS and communication speed is increasing based on the current technical evolution trend.

FIG. 1 is a high-level schematic illustration of a computing system which is configured to optimize GPU memory allocation for high-performance computing, according to an embodiment of the invention. In particular, FIG. 1 schematically illustrates a HPC system 100 which comprises a deep learning computing platform 110, a GPU memory optimization module 120, GPU drivers 130, one or more GPU devices 140, and optional data compression/decompression hardware accelerators 150. The deep learning computing platform 110 comprises a deep learning model 112, and a deep learning compute module 114. The GPU memory optimization module 120 comprises a model layer tracking module 122, a datastore of metadata 124, a GPU memory manager module 126, and a compression/decompression engine 128. The GPU device(s) 140 each comprise a plurality of GPU processing cores 142, GPU memory 144, and an internal bus 146, wherein the GPU cores 142 access the GPU memory 144 over the internal bus 146. In the example embodiment of FIG. 1, the GPU memory optimization module 120 comprises a middleware-level framework which resides between the deep learning computing platform 110 and the GPU hardware drivers 130 to provide GPU memory allocation and data compression/decompression functions in a manner that is transparent to the deep learning computing platform 110, using methods as explained in further detail below.

The deep learning computing platform 110 comprises a software platform to support deep learning applications such as model training and inference processing (or classification). The deep learning computing platform 110 can be implemented using known commercially available machine learning platforms such as Tensorflow, Microsoft Cognitive Toolkit (CNTK), Apache MXNet, Caffe, and other open-source deep learning frameworks that are configured to train, and deploy deep neural networks for HPC applications. The deep learning model 112 can implement one or more different types of models such as CNN models, recurrent neural network (RNN) models, region-based CNN (R-CNN) models, faster R-CNN models, mask R-CNN models, and other state-of-the-art DL models that are commonly utilized for high-performance DL computing applications.

The deep learning compute module 114 comprises software libraries and application programming interfaces (APIs) that include pre-written code, classes, procedures, scripts, configuration data, etc., which can be called or otherwise utilized by the GPU devices 140 for executing machine learning tasks and related functions, or which can be accessed to communicate with the GPU devices 140 through the GPU drivers 130. The types of software libraries and APIs of the deep learning compute module 114 will vary depending on the particular framework of the deep learning computing platform 110. In one embodiment, the deep learning compute module 114 implements commercially available library and/or API platforms such CUDA®, which is a parallel computing platform and application programming interface created by NVIDIA. The CUDA API enables the use of CUDA-enabled GPUs for general purpose processing. The CUDA platform is a software layer that allows direct access to the instruction set and parallel computational elements of a GPU, for executing compute kernels.

In particular, the NVIDIA CUDA API comprises the CUDA® Deep Neural Network library (cuDNN) library and the NVIDIA cuBLAS library. As is known in the art, cuDNN is a GPU-accelerated library of primitives for deep neural networks, which provides implementations for standard routines such as forward and backward propagation operations in DL models comprising convolution layers, pooling layers, normalization layers, activation layers, etc. The cuDNN library is utilized by various deep learning frameworks, such as Tensorflow, CNTK, MXNet, Keras, and Caffe, to support high-performance GPU acceleration. The NVIDIA cuBLAS library is a fast GPU-accelerated implementation of the standard basic linear algebra subroutines (BLAS). The cuBLAS APIs allow an application to be accelerated by deploying compute-intensive operations to a single GPU or distributing work across multi-GPU configurations. Keras is a high-level neural networks API, written in Python and capable of running on top of TensorFlow, CNTK In one embodiment, the GPU drivers 130 are implemented using cuDNN.

In general, deep learning frameworks implement methods for training DL models (e.g., DNN models such as CNN) to support machine learning and pattern recognition applications. Despite their different topology at the network-level, different types of DNNs are essentially built from the same pool of functional layers, including fully connected layers, convolutional layers, pooling layers, etc., wherein different configurations, combinations, sequences, etc., of the functional layers are generated to construct different DNNs for different learning and inference tasks. Depending on the deep learning framework, the DL model comprises a plurality of functional layers that are sequentially processed in a predefined order (e.g., conv1, conv2, ..., pooling, fully connected, etc.), wherein the functional layers are defined by a developer using the APIs from the deep learning compute module 114 of the DL framework. The functional layers of a DL model invoke the GPU optimized libraries (e.g., NVIDIA cuDNN or cuBLAS), and run as GPU kernel functions in the GPU cores 142 of the GPU devices 140

The GPU memory optimization module 120 comprises a middleware layer of a software stack which comprises the deep learning computing platform 110 and the GPU drivers 130. The GPU memory optimization module 120 is disposed between the deep learning compute module 114 and the GPU drivers 130, and executes transparently in user space to efficiently optimize the allocation and use of the GPU memory 144 of the GPU devices 140 when executing workloads. In particular, the model layer tracking module 122 of the GPU memory optimization module 120 implements methods that are configured to dynamically determine the layer structure of a given DL model, wherein the layer structure comprises the different types of functional layers (e.g., convolution, pooling, drop-out, fully connected, etc.) of the given DL model, and the predefined (programmed) sequential order of the functional layers (e.g., for each functional layer of a given DL model, the metadata comprises information regarding an identity of a previous layer and a next layer). The layer structure information for the given DL model is stored as metadata in the metadata datastore 124. The metadata 124 representing the layer structure of the given DL model is utilized during a DL processing task to proactively guide data compression and decompression functions implemented by the compression/decompression engine 128.

In one embodiment, the model layer tracking module 122 is configured to intercept API calls (on the fly) between the deep learning computing platform 110 and the GPU resources when executing a deep learning task on the computing node 100, and automatically determine the layer structure of the DL model using information associated with the intercepted API calls. This process for determining the DL model layer structure provides minimum overhead as it involves intercepting a function call, and then forwarding the original function call to the target of the API.

The model layer tracking module 122 can identify the different types of constituent functional layers for a given model based on class names that are included in the DL program code. For example, the Caffe deep learning system utilizes class names conv1, conv2, ..., etc. to define different convolution layers, and pool1, pool2, ..., etc. to define different pooling layers. As another example, the Keras Deep Learning System utilizes class names such as Conv2D, MaxPooling2D, and Dropout to define convolution, pooling and dropout layers. As a further example, the following cuDNN APIs (or routines) can be intercepted and processed to extract the layer structure of a given DL model: ConvolutionForward, PoolingForward; PoolingBackward; ConvolutionBackwardFilter; ConvolutionBackwardBias; ConvolutionBackwardData, Sgemm; etc.

The compression/decompression engine 128 comprises GPU kernel functions that are utilized to proactively compress and decompress DL data (e.g., filter parameters, feature maps, etc.) which is utilized and generated by active functional layers that are sequentially invoked during the execution of a DL task (e.g., DL model training), so that the active DL data can be efficiently stored in the GPU memory 144 for high speed access by the GPU cores 142 of the GPU device 140 executing the active functional layers. For example, after invoking a current functional layer of a given DL model for processing, a data compression operation can be performed to compress the data (e.g., filter parameters) of a previous functional layer of the DL model, and store the compressed data of the previous functional layer in the GPU memory 144 of the GPU device 140. In addition, compressed data of a next functional layer of the DL model can be accessed from the GPU memory 144 and then decompressed for subsequent processing by the next functional layer of the given DL model by the GPU device.

In one embodiment of the invention, the data compression and decompression operations of the GPU memory optimization module 120 are performed by executing kernel functions in the GPU devices 140. The GPU kernel functions of the data compression/decompression engine 128 can be implemented using any suitable methods for lossless data compression and decompression, which can be efficiently executed by GPU devices with relatively low GPU utilization. For example, the GPU compression/decompression kernel functions can be defined using a GPU programming language such as CUDA, or using data compression and decompression routines supported by commercially available compression/decompression libraries for GPU and other hardware accelerators.

In another embodiment, the compression and decompression operations can be performed using the optional data compression/decompression hardware accelerators 150. In the example embodiment of FIG. 1, the data compression/decompression hardware accelerators 150 are hardware elements that can be either integrated within the GPU devices 140, or otherwise implemented as separate hardware accelerators which are accessible by the GPU devices 140. For example, the data compression/decompression hardware accelerators 150 can be integrated with memory controllers of the GPU devices 140, or implemented using hardware processing elements that are integrated within memory within the GPU devices 140 (which is known as "processing in memory" (PIM)). The use of hardware-based data compression and decompression acceleration increases the data processing efficiency by, e.g., reducing the time needed for data compression/decompression (as compared to executing data compression and decompression kernels in the GPU cores 142 of the GPU devices 140), and freeing up more GPU resources for executing DL workloads.

The ability to effectively implement and perform proactive data compression and decompression operations by the GPU memory optimization module 120 is based on various characteristics of the deep learning computing platform 110. For example, while most DL models are defined using many functional layers (convolutional, pooling, fully connected, etc.), because of the data dependency across the functional layers, and a GPGPU framework which implements a single instruction, multiple thread (SIMT) execution model (i.e., parallel computing where single instruction, multiple data is combined with multithreading), the GPU processing of DL workloads is executed in a layer-per-layer manner. In this regard, at any given point in the execution of a given DL task, the GPU device will only need to access and process the data (e.g., input data such as the feature maps from a previous layer, filter parameters, etc.) of only one (or a few) functional layer which is currently active.

Furthermore, the intermediate results (e.g., weights, gradients, feature maps, etc.) that are generated by a given functional layer are compression friendly, or even sparse. As such, the intermediate data generated during a DL process flow can be efficiently compressed at a compression ratio of 10× or greater. In addition, since the parameters and feature maps of the functional layers consume most of GPU memory, and can be efficiently compressed, a significant reduction is usage of GPU memory can be realized during DL processing by the seamless compression and decompression operations.

The GPU memory manager module 126 implements methods that are configured to manage the GPU memory 144 by, e.g., allocating and deallocating GPU memory, tracking information regarding the state (e.g., compressed, decompressed, ready, etc.) and GPU memory locations of the data associated with functional layers of a given DL model being processed. More specifically, in one embodiment, the GPU memory manager module 126 maintains, for each functional layer (i) a data pointer to the location in memory of the input data of the functional layer, (ii) a data pointer to the location in memory of the output data of the layer, (iii) the original (non-compressed) size of the data of the functional layer, and (iv) a current state of the data of the functional layer. This information is maintained as metadata in the database of metadata 124. In one embodiment, the database of metadata 124 is maintained in the GPU memory 144 with a minimal memory footprint.

To reduce the impact of frequent GPU memory allocation and deallocation (free) operations, such as in Nvidia, the GPU memory allocation can be blocked and synchronized with other active operations. In one embodiment, the GPU memory 144 is allocated as a memory pool such that any application level allocation request is served from a pre-allocated pool to reduce driver call overhead and impact to other operations. In one embodiment, the GPU memory manager module 126 can be implemented using the open-source CNMeM library (from NVIDIA) to support management of CUDA GPU memory within the deep learning framework.

Figure 2:
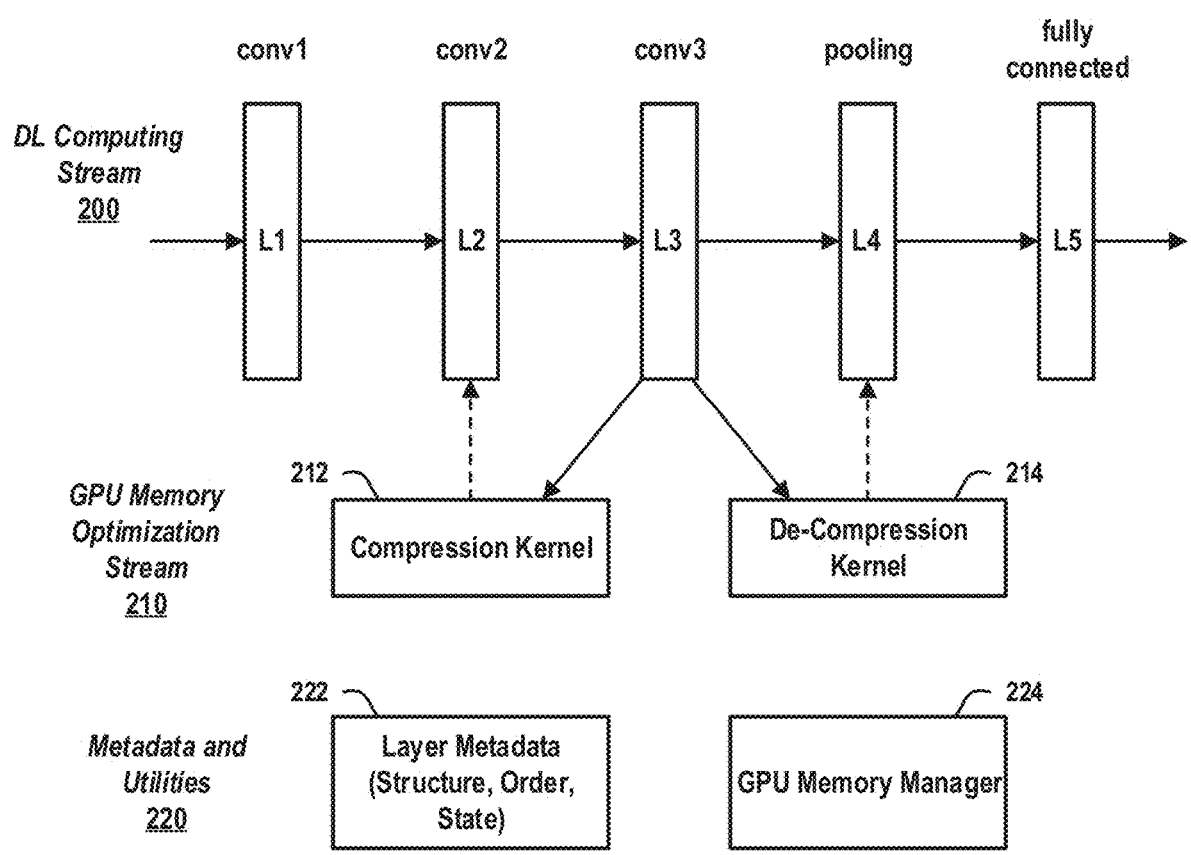
FIG. 2 schematically illustrates an exemplary run-time implementation of the system of FIG. 1 to optimize GPU memory allocation when executing a deep learning task, according to an embodiment of the invention.

FIG. 2 schematically illustrates an exemplary run-time implementation of the system of FIG. 1 to optimize GPU memory allocation when executing a deep learning task, according to an embodiment of the invention. In particular, FIG. 2 schematically illustrates a forward propagation process flow for a deep learning task in which a DL computing stream 200 is implemented by a DL model comprising a plurality of functional layers L1, L2, L3, L4 and L5 that are processed in a predefined sequence. In the example embodiment of FIG. 2, a first layer L1 comprises a first convolution layer (conv1), a second layer L2 comprises a second convolution layer (conv2), a third layer L3 comprises a third convolution layer (conv3), a fourth layer L4 comprises a pooling layer, and a fifth layer L5 comprises a fully connected layer. Further, FIG. 2 schematically illustrates a GPU memory optimization stream 210 in which a data compression kernel function 212 and a data de-compression kernel function 214 execute in one or more GPU devices and generate compression and de-compression data streams. The term "stream" is a widely used GPU term in CUDA. Logically, a "stream" comprises a queue with a GPU kernel function, wherein multiple operators/functions can be added into streams, wherein the streams are scheduled in order (e.g., FIFO (first-in, first-out)). The operations in a given stream are executed by a GPU in a strict order, and one or more GPUs may concurrently execute multiple streams. In general, there is no specified order across the streams 200 and 210 unless the streams are explicitly synchronized using a suitable synchronization protocol, e.g., a locking mechanism, etc.

FIG. 2 further illustrates run time implementations of metadata and utilities 220 wherein the model layer tracking module 122 (FIG. 1) extracts and maintains layer metadata 222 (which is maintained in a region of GPU memory), and wherein a GPU memory manager utility 224 is instantiated to manage the memory of the GPU devices 140 (FIG. 1). The layer metadata 222 comprises information regarding the DL model structure (type of layers and order of layers) L1→L2→L3→L4→L5 of the DL computing stream 200. The GPU memory manager 224 enqueues pre-defined callbacks which handle the GPU memory optimization, e.g., events to decompress data of next layer proactively, and events to compress data of a previous layer. Similar rules apply to DL backward propagation operations. The callbacks for the compression and decompression kernel functions could execute in separate GPU stream(s) for concurrent execution.

Thus, in general, even with a deep layer structure, a relatively small amount of active memory is needed to store data for a few active layers, while maintaining the data of other layers in a compressed state to minimize memory utilization. Moreover, since the data compression/decompression functions are performed by the GPU devices, there is no I/O data moving in and out of the GPUs in connection with the memory optimization operations and, thus, there is no additional pressure on a CPU-GPU PCIe bus. The GPU memory optimization operations are transparent to the application and DL framework. Again, the GPU memory optimization module 120 dynamically intercepts all relevant GPU APIs, extracts metadata information regarding the layer structure of the given DL model, manages the layer structure metadata and other metadata in GPU memory, and injects additional kernel functions such as data compression and de-compression kernel in separate GPU streams.

Figure 3:
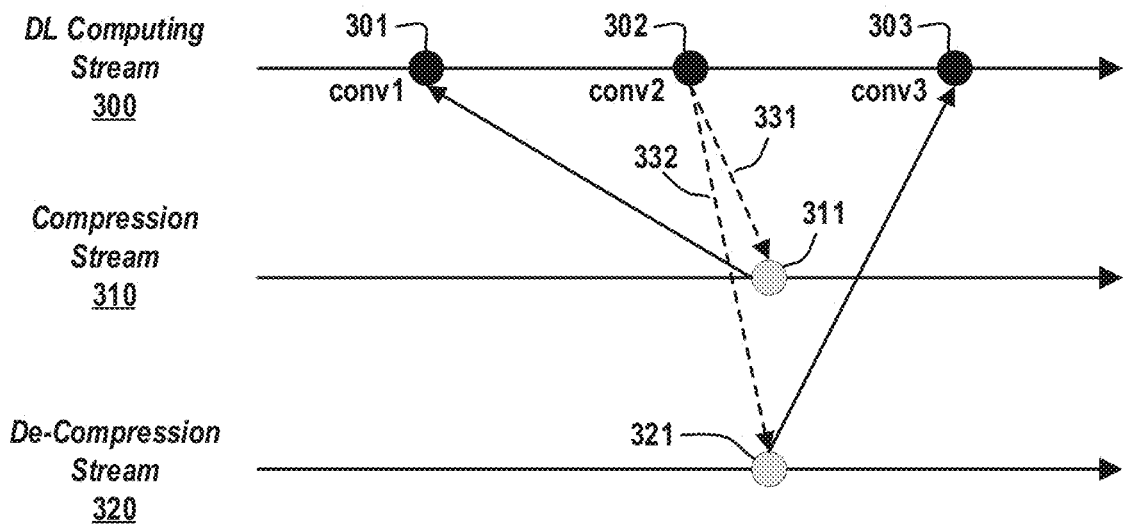
FIG. 3 schematically illustrates a method for concurrently executing deep learning, compression, and decompression operations using separate GPU streams to optimize GPU memory allocation, according to an embodiment of the invention.

FIG. 3 schematically illustrates a method for concurrently executing deep learning, compression, and decompression operations using separate GPU streams to optimize GPU memory allocation, according to an embodiment of the invention. In particular, FIG. 3 illustrates interactions between a DL computing stream 300, a compression stream 310, and a de-compression stream 320. The DL computing stream 300 comprises three sequential convolutional layer operations 301, 302, and 303. The compression stream 310 comprises a data compression operation 311, and the de-compression stream 320 comprises a data de-compression operation 321. FIG. 3 further illustrates GPU events 331 and 332 (represented by dashed arrows), which provide a GPU notification mechanism to provide notification when a certain task is complete, or to provide notification to a given stream to wait for completion of some specific task before proceeding.

In the example embodiment of FIG. 3, a first event 331 is issued when the second convolutional layer operation 302 (conv2 layer) is invoked. The first event triggers compression of the data (e.g., parameters, weighs, feature maps, etc.) of the first convolution layer operation 301 (the previous conv1 layer), updates the data states and data pointers, and frees old GPU memory. The second event 332 is used to trigger decompression 321 of the data (e.g., parameters, weights, etc.) of the next layer conv3, i.e., convolutional layer operation 303 (where it is a assumed that a large amount of GPU memory is required to accommodate the decompressed data), and to update the data state and data pointers.

The proactive decompression operations, etc., can be performed on a next one or several layers which may consume more memory. Whether decompression is performed or not can be reflected in the metadata state and notified via a GPU event. Further, the compression operations can be tuned to achieve a good balance between the compression ratio and performance. In one embodiment, the compression operations are performed using lossless compression techniques to avoid any reduction in the training accuracy of the DL model.

Figure 4:
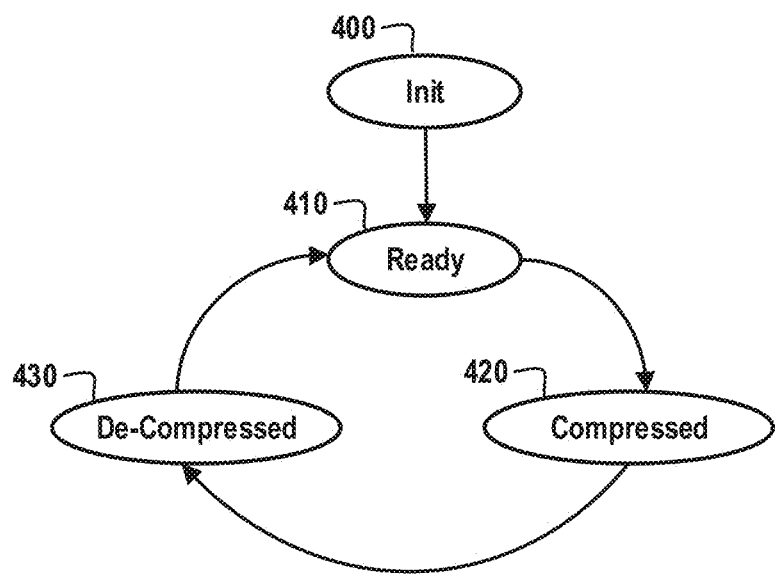
FIG. 4 illustrates a state diagram which represents data states that are maintained by a GPU memory manager module for each functional layer of a deep learning model, according to an embodiment of the invention.

FIG. 4 illustrates a state diagram which represents data states that are maintained by the GPU memory manager module 126 (FIG. 1) for each functional layer of a deep learning model, according to an embodiment of the invention. As noted above, the GPU memory manager module 126 maintains for each functional layer of a DL model the state of the data and memory pointers to the data in GPU memory. In one embodiment, the GPU memory manager module 126 tracks data states for each layer, including, e.g., an initialization state 400, a ready state 410, a compressed state 420 and a decompressed state 430.

Figure 5:
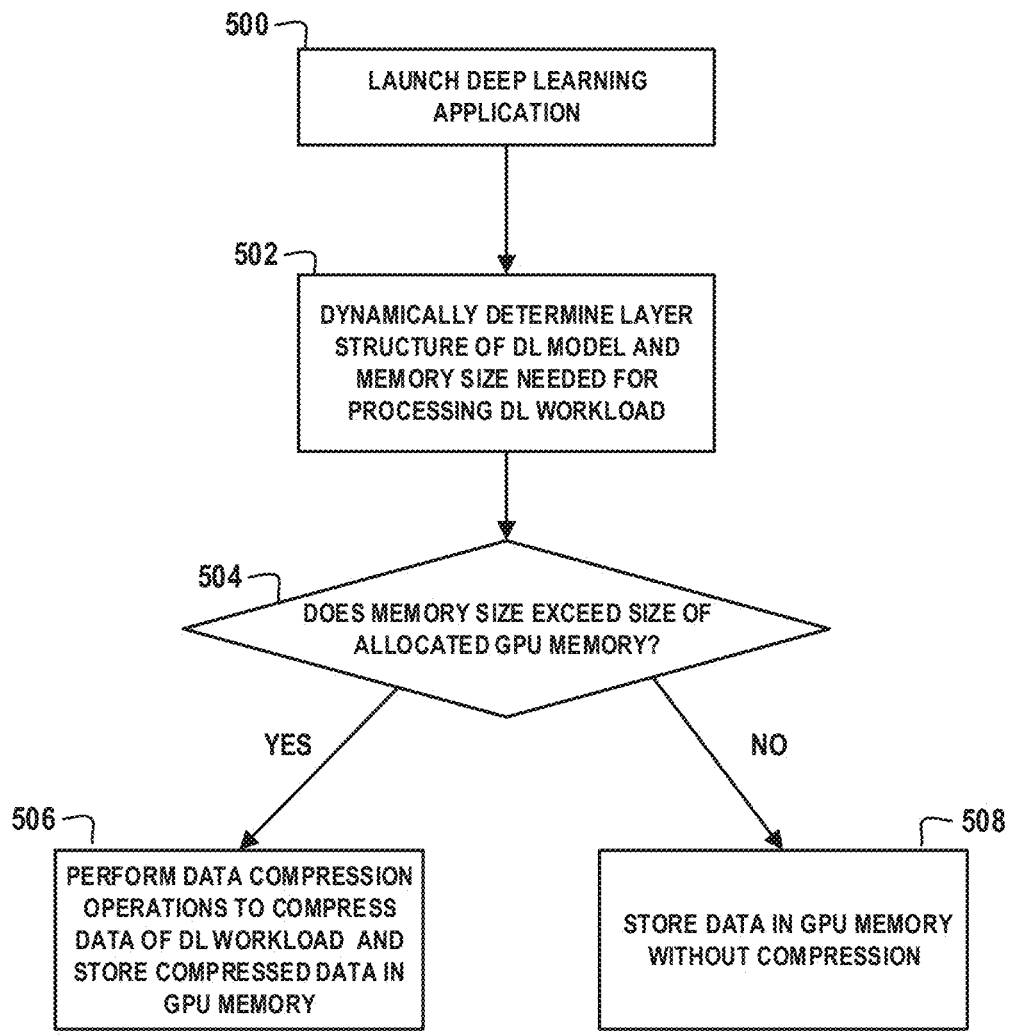
FIG. 5 is a flow diagram of a method for optimizing GPU memory allocation for high-performance computing, according to an embodiment of the invention.

FIG. 5 is a flow diagram of a method for optimizing GPU memory allocation for high-performance computing, according to an embodiment of the invention. The method shown in FIG. 5 provides an embodiment in which the compression/decompression functionalities of the GPU memory optimization module 120 (FIG. 1) can be temporarily disabled for a given DL task in circumstances wherein the data needed for the given DL task can be readily stored in GPU memory in a non-compressed format. In an alternate embodiment, the compression/decompression functionalities of the GPU memory optimization system 120 can utilized by default irrespective of the GPU memory requirements for storing the data needed for the given DL task.

In particular, referring to FIG. 5, a deep learning application is launched on a computing node (block 500). As noted above, the GPU memory optimization module 120 on the given computing mode will dynamically determine the layer structure of the DL model (using methods as discussed above), as well as determine an amount of GPU memory needed to store data associated with processing of the DL workload in a non-compressed format (bock 502). If the GPU memory size needed to store the DL data exceeds the size of the GPU memory allocated for processing the DL workload (affirmative determination in block 504), the GPU memory optimization module 120 can perform data compression operations on the DL data to compress the DL data and store the compressed data in the GPU memory (block 506). On the other hand, if the GPU memory size needed to store the DL data does not exceed the size of the GPU memory allocated for processing the DL workload (negative determination in block 504), the DL data can be stored in the allocated GPU memory in a non-compressed format (block 508). For example, in a cloud environment (e.g., FIG. 7), the GPU memory optimization module 120 can be implemented by default, or otherwise evaluate the memory requirement of the DL application, and enable the memory compression functionality if the memory required for the DL application is close to the physical size of the GPU hardware, or close to reaching a maximum GPU memory allocation quota in the case of a shared GPU processing environment (such as GPUaaS).

Figure 6:
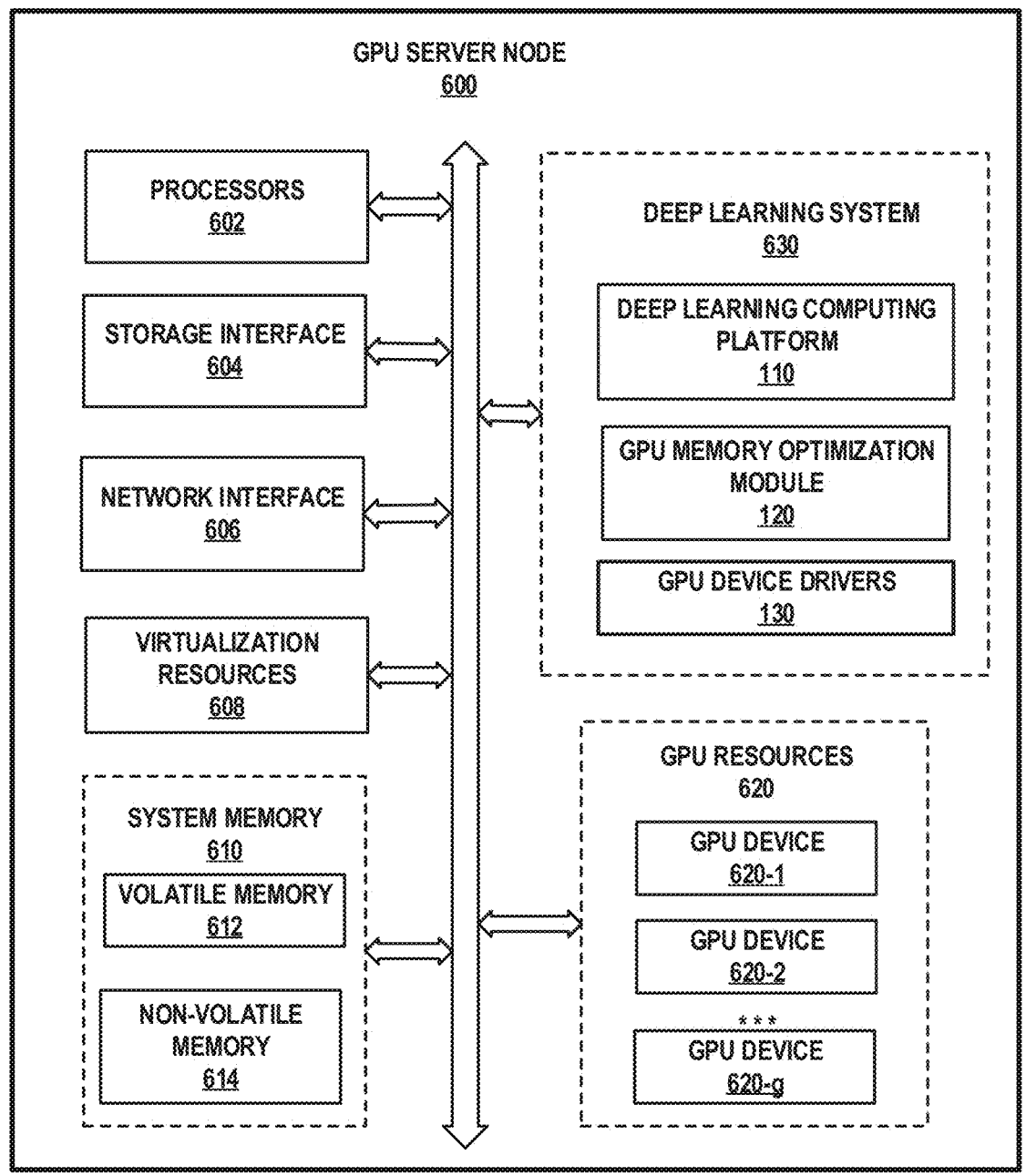
FIG. 6 schematically illustrates a GPU server node which implements a GPU memory optimization system for high-performance computing, according to an embodiment of the invention.

While FIG. 1 generically illustrates a HPC system 100 which implements a GPU memory optimization system according to an embodiment of the invention, the HPC system of FIG. 1 can be integrated with one or more GPU server nodes which are configured to implement a GPU-as-a-Service (GPUaaS) platform for deep learning computing or other HPC applications. For example, FIG. 6 schematically illustrates a GPU server node 600 which comprises hardware processors 602, storage interface circuitry 604, network interface circuitry 606, virtualization resources 608, system memory 610, GPU resources 620, and a deep learning system 630. The system memory 610 comprises volatile memory 612 and non-volatile memory 614. The GPU resources 620 comprise one or more GPU devices 620-1, 620-2, . . . , 620-g. The deep learning system 630 comprises a software stack which is the same or similar to the software stack shown in FIG. 1 comprising the deep learning computing platform 110, the GPU memory optimization module 120, and the GPU device drivers 130.

In one embodiment, the various system components 110, 120 and 130 of the deep learning system 630 comprise software modules that are persistently stored in a storage device and loaded into the system memory resources (e.g., volatile memory 612 and/or non-volatile memory 614), and executed by the processors 602 to perform respective functions as described herein. In this regard, the system memory 610 resources and other memory or storage media as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The processors 602 may comprise one or more processors that are configured to process program instructions and data to execute a native operating system (OS) and applications that run on the GPU server node 600. For example, the processors 602 may comprise one or more central processing units (CPUs), a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, GPUs, digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general-purpose processor.

The storage interface circuitry 604 enables the processors 602 to interface and communicate with the system memory 610, and other local storage and off-infrastructure storage media, using one or more standard communication and/or storage control protocols to read data from or write data to volatile and non-volatile memory/storage devices. The network interface circuitry 606 enables the GPU server node 600 to interface and communicate with a network and other system components. The network interface circuitry 606 comprises network controllers such as network cards and resources (e.g., network interface cards, I/O adaptors, converged ethernet adaptors, etc.) to support communication protocols and interfaces including, but not limited to, PCI Express (PCIe), direct memory access (DMA) and remote DMA (RDMA) data transfer protocols, etc.

The virtualization resources 608 can be instantiated to execute one or more applications or functions which are hosted by the GPU server node 600. For example, the virtualization resources 608 can be configured to implement the various modules and functionalities of the deep learning system 630. In one embodiment, the virtualization resources 608 comprise virtual machines that are implemented using a hypervisor platform which executes on the GPU server node 600, wherein one or more virtual machines can be instantiated to execute functions of the GPU server node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on physical infrastructure, e.g., CPUs and/or storage devices, of the GPU server node 600, and emulates the CPUs, memory, hard disk, network and other hardware resources of a host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the GPU server node 600. In yet another embodiment, containers may be used in combination with other virtualization infrastructure such as virtual machines implemented using a hypervisor, wherein Docker containers or other types of LXCs are configured to run on virtual machines in a multi-tenant environment.

The system memory 610 comprises electronic storage media such as random-access memory (RAM), read-only memory (ROM), or other types of memory, in any combination. The term "memory" or "system memory" as used herein refers to volatile and/or non-volatile memory which is utilized to store application program instructions that are read and processed by the processors 602 to execute a native operating system and one or more applications hosted by the GPU server node 600, and to temporarily store data that is utilized and/or generated by the native OS and application programs running on the GPU server node 600. For example, the volatile memory 612 of the system memory 610 may be a dynamic random-access memory (e.g., DRAM) or other forms of volatile random-access memory. The non-volatile memory 614 may comprise a storage-class memory (SCM) that is accessible as a memory resource. For example, the non-volatile memory 614 may be a NAND Flash storage device, a SSD (solid state drive) storage device, or other types of next generation non-volatile memory (NGNVM) devices.

Figure 7:
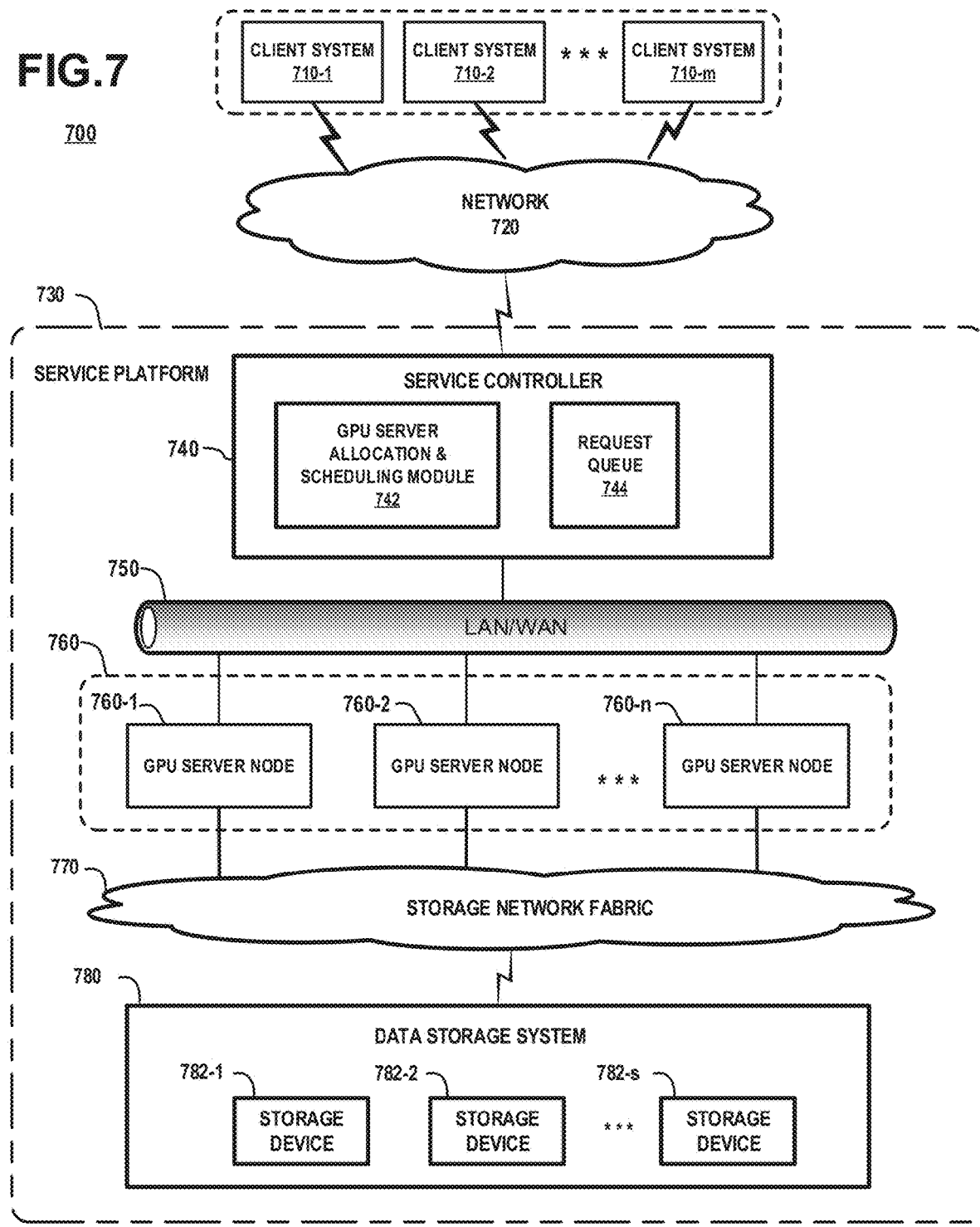
FIG. 7 is a high-level schematic illustration of a computing system which implements a service platform comprising a GPU server cluster configured to support GPU memory optimization system for high-performance computing, according to an embodiment of the invention.

FIG. 7 is a high-level schematic illustration of a computing system which implements a service platform comprising a GPU server cluster configured to support a GPU memory optimization system for high-performance computing, according to an embodiment of the invention. The computing system 700 comprises a plurality (m) of client systems 710-1, 710-2, . . . , 710-m (collectively referred to as client systems 710), a communications network 720, and a service platform 730 which can be accessed by the client systems 710 over the communications network 720. The service platform 730 comprises a service controller 740 (e.g., a control server), a service platform network 750, a server cluster 760 (e.g., server farm) comprising a plurality (n) of GPU server nodes 760-1, 760-2, . . . , 760-n, a storage network fabric 770, and a data storage system 780 comprising a plurality of data storage devices 782-1, 782-2, . . . , 782-s. The service controller 740 comprises a GPU server allocation and scheduling module 742 and a request queue 744. The GPU server nodes 760-1, 760-2, . . . , 760-n are implemented using the same or similar architecture as the GPU server node 600 of FIG. 6.

The client systems 710 comprise various types of computing devices such as desktop computers, laptop computers, electronic tablets, etc. In another embodiment, the client systems 710 may comprise servers in a data center which require GPU processing services. The communications network 720 is configured to enable network communication between the client systems 710 and the service platform 730. While the communications network 720 is generically depicted in FIG. 7, it is to be understood that the communications network 720 may comprise any known communication network such as, a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the network 720 in some embodiments comprises combinations of multiple different types of communications networks each comprising network devices configured to communicate using Internet Protocol (IP) or other related communication protocols. The network 720 comprises intermediate points (such as routers, switches, etc.) and other elements that form a network backbone to establish communication paths and enable communication between network endpoints.

The service platform network 750 is configured to enable communication between the service controller 740 and the GPU server nodes 760-1, 760-2, ..., 760-n of the server cluster 760, as well as to enable peer-to-peer network communication between the GPU server nodes 760-1, 760-2, ..., 760-n within the server cluster 760. Depending on the network distribution and geographic location of the constituent components and nodes of the service platform 730, the service platform network 750 may comprise, for example, a LAN, a WAN, or a combination of one or more LANs and WANs, as well as other types of communications networks that are commonly used to implement cloud computing platforms. The storage network fabric 770 can be implemented using any suitable networking system and protocol to enable shared access to the data storage system 780 by the GPU server nodes 760-1, 760-2, ..., 760-n of the server cluster 760. In one embodiment, the service platform network 750 and the storage network fabric can be integrated into a converged framework such as a converged ethernet framework using known techniques.

The data storage system 780 can be implemented using any suitable data storage system, or combination of data storage systems, including, but not limited to storage area network (SAN) systems, direct attached storage (DAS) systems, Hadoop Distributed File System (HDFS), a serial attached storage (SAS/SATA) system, as well as other types of data storage systems comprising clustered or distributed virtual and/or physical infrastructure. The data storage devices 782-1, 782-2, ..., 782-s comprise non-volatile storage media to provide persistent storage resources for the GPU server nodes 760-1, 760-2, ..., 760-n of the server cluster 760 (e.g., to store training data used for deep learning applications). The data storage devices 782-1, 782-2, ..., 782-s may include one or more different types of persistent storage devices, or data storage arrays, such as hard disk drives (HDDs) or solid-state drives (SSDs), or other types and combinations of non-volatile memory. In one embodiment, the data storage devices 782-1, 782-2, ..., 782-s are implemented using, for example, an enterprise-class storage platform comprising high performance, scalable storage arrays, which can be implemented for hyper-scale computing systems.

Furthermore, the GPU server cluster 760 can be implemented as part of a private or public computing platform (e.g. data center, cloud computing system, online social network) to provide GPU processing services for HPC applications such as deep learning applications, and other machine learning applications. Furthermore, the GPU server nodes 760-1, 760-2, ..., 760-n of the server cluster 760 may implement one of many types of commercially available server systems including, but not limited to, a Windows server, a Sun Solaris server, an HP server, a Linux server, etc. The GPU sever cluster 760 can be a constituent component of a data center or cloud computing platform that performs data computing and data storage functions to support one or more network applications and/or on-line services that deliver consumer or business applications and services to multiple end users, service providers, and/or organizations. In one embodiment, the service platform 730 comprises a Deep Learning-as-a-Service (DLaaS) platform, wherein one or more of the GPU server nodes 760-1, 760-2, ..., 760-n hosts a deep learning system 630 as shown in FIG. 6 to support a DLaaS service that can be utilized by the client systems 710.

The service controller 740 is configured to control various functionalities of the service platform 730. For example, the GPU server allocation and scheduling module 742 is configured to manage and schedule provisioning of GPU resources over one or more of the GPU server nodes 760-1, 760-2, ..., 760-n in the GPU server cluster 760 for the client systems 710. The service controller 740 is configured to receive service requests from the client systems 710 for HPC processing services provided by the service platform 730, maintain the pending service requests and associated information in the request queue 744, and invoke the GPU server allocation and scheduling module 742 to allocate and schedule one or more of the GPU server nodes 760-1, 760-2, ..., 760-n in the sever GPU server cluster 760 to handle the execution of GPU processing tasks associated with the received service requests. The GPU server allocation and scheduling module 742 will allocate either a single GPU server node or multiple GPU server nodes within the cluster of GPU server nodes 760 to handle the service request depending on, e.g., the available GPU devices and processing resources of the GPU server nodes, the nature of the GPU processing tasks associated with the service request, etc.

The GPU server allocation and scheduling module 742 implements methods that are configured for scheduling and allocating one or more GPU server nodes for executing GPU workloads associated with service requests. For example, in one embodiment of the invention, for a GPU server node allocation wherein multiple GPU devices across multiple GPU server nodes in the server cluster 760 are allocated to a given client system, the GPU server allocation and scheduling module 742 can be configured to communicate with the GPU server nodes to provision GPU resources, allocate master and slave GPU server nodes, and command the allocated GPU server nodes to logically bind together and establish communication links to conduct peer-to-peer operations for executing the GPU processing tasks associated with the client request. Such techniques are disclosed in commonly assigned U.S. patent application Ser. No. 15/487,887, filed on Apr. 14, 2017, entitled "Managing Access to a Resource Pool of Graphics Processing Units Under Fine Grain Control," the disclosure of which is incorporated herein by reference. With such techniques, a given client system will see a larger logical GPU server node, while a master GPU server node coordinates and manages execution of the GPU processing tasks across all of the allocated GPU server nodes with fine grain control, transparently to the client system.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
executing a deep learning task using graphics processing unit (GPU) resources on a computing node, wherein the GPU resources comprise at least one GPU device and GPU memory, and wherein the deep learning task is executed using a deep learning model comprising a plurality of functional layers that are processed in a predefined sequence;
wherein executing the deep learning task comprises:
invoking a current functional layer of the deep learning model, and processing, by the at least one GPU device, the current functional layer by using model data of the current functional layer to process output data generated by a previous functional layer; and
in response to the invoking of the current functional layer, performing a plurality of operations during processing of the current functional layer, wherein performing the plurality of operations during processing of the current functional layer comprises:
accessing the model data of the current functional layer for processing by the at least one GPU device, the accessed model data of the current functional layer comprising decompressed model data of the current functional layer generated by a data decompression process performed on compressed model data of the current functional layer during processing of the previous functional layer prior to the invoking of the current functional layer;
during processing of the current functional layer, invoking a compression process and a decompression process;
during processing of the current functional layer, performing a data compression operation by the at least one GPU device using the invoked compression process to compress model data of the previous functional layer of the deep learning model and store the compressed model data of the previous functional layer in the GPU memory; and
during processing of the current functional layer, accessing compressed model data of a next functional layer of the deep learning model from the GPU memory and performing a data decompression operation by the at least one GPU device using the invoked decompression process to decompress the compressed model data for subsequent processing of the next functional layer by the at least one GPU device in advance of invoking the next functional layer.

2. The method of claim 1, wherein the deep learning task comprises a deep learning model training task comprising forward and backward propagation operations.

3. The method of claim 1, wherein the processing of the current functional layer, the data compression operation, and the data decompression operation are executed as separate processing streams by the at least one GPU device.

4. The method of claim 1, wherein the data compression operation and the data decompression operation are performed by loading and executing a compression kernel and a decompression kernel in the at least one GPU device.

5. The method of claim 1, wherein the data compression operation and the data decompression operation are performed using hardware compression and decompression accelerators.

6. The method of claim 5, wherein hardware compression and decompression accelerators are integrated within the at least one GPU device.

7. The method of claim 1, further comprising maintaining metadata in the GPU memory, wherein the metadata comprises:
a layer structure of the deep learning model, wherein the layer structure comprises an identifier of each functional layer in the deep learning model and information regarding the predefined sequence of the functional layers of the deep learning model;
for each functional layer, data pointers to input data and output data of the functional layer stored in the GPU memory; and
for each functional layer, an indication of a current state of the input data and the output data of the functional layer, wherein the current state comprises one of a compressed state, a decompressed state, and a ready state.

8. The method of claim 7, further comprising:
intercepting application programming interface (API) calls between the deep learning task executing on the computing node and the GPU resources; and
automatically determining the layer structure of the deep learning model using the intercepted API calls.

9. The method of claim 1, wherein:
the functional layers of the deep learning model comprise a sequence of two or more convolutional layers;
the model data of the convolutional layers comprises respective filter parameters used for processing input data to the convolutional layers;
output data generated by the convolutional layers comprises feature maps; and
the filter parameters and feature maps of the convolutional layers are compressed and stored in the GPU memory.

10. An article of manufacture comprising a non-transitory processor-readable storage medium having stored program code of one or more software programs, wherein the program code is executable by one or more processors to implement method steps comprising:
executing a deep learning task using graphics processing unit (GPU) resources on a computing node, wherein the GPU resources comprise at least one GPU device and GPU memory, and wherein the deep learning task is executed using a deep learning model comprising a plurality of functional layers that are processed in a predefined sequence;
wherein executing the deep learning task comprises:
invoking a current functional layer of the deep learning model, and processing, by the at least one GPU device, the current functional layer by using model data of the current functional layer to process output data generated by a previous functional layer; and
in response to the invoking of the current functional layer, performing a plurality of operations during processing of the current functional layer, wherein performing the plurality of operations during processing of the current functional layer comprises:

accessing the model data of the current functional layer for processing by the at least one GPU device, the accessed model data of the current functional layer comprising decompressed model data of the current functional layer generated by a data decompression process performed on compressed model data of the current functional layer during processing of the previous functional layer prior to the invoking of the current functional layer;

during processing of the current functional layer, invoking a compression process and a decompression process;

during processing of the current functional layer, performing a data compression operation by the at least one GPU device using the invoked compression process to compress model data of the previous functional layer of the deep learning model and store the compressed model data of the previous functional layer in the GPU memory; and during processing of the current functional layer, accessing compressed model data of a next functional layer of the deep learning model from the GPU memory and performing a data decompression operation by the at least one GPU device using the invoked decompression process to decompress the compressed model data for subsequent processing of the next functional layer by the at least one GPU device in advance of invoking the next functional layer.

11. The article of manufacture of claim 10, wherein the processing of the current functional layer, the data compression operation, and the data decompression operation are executed as separate processing streams by the at least one GPU device.

12. The article of manufacture of claim 10, wherein the data compression operation and the data decompression operation are performed by loading and executing a compression kernel and a decompression kernel in the at least one GPU device.

13. The article of manufacture of claim 10, wherein the data compression operation and the data decompression operation are performed using hardware compression and decompression accelerators within the at least one GPU device.

14. The article of manufacture of claim 10, further comprising executable program code for maintaining metadata in the GPU memory, wherein the metadata comprises:

a layer structure of the deep learning model, wherein the layer structure comprises an identifier of each functional layer in the deep learning model and information regarding the predefined sequence of the functional layers of the deep learning model;

for each functional layer, data pointers to input data and output data of the functional layer stored in the GPU memory; and for each functional layer, an indication of a current state of the input data and the output data of the functional layer, wherein the current state comprises one of a compressed state, a decompressed state, and a ready state.

15. The article of manufacture of claim 14, further comprising executable program code for:

intercepting application programming interface (API) calls between the deep learning task executing on the computing node and the GPU resources; and automatically determining the layer structure of the deep learning model using the intercepted API calls.

16. The article of manufacture of claim 10, wherein:

the functional layers of the deep learning model comprise a sequence of two or more convolutional layers;

the model data of the convolutional layers comprises respective filter parameters used for processing input data to the convolutional layers;

output data generated by the convolutional layers comprises feature maps; and the filter parameters and feature maps of the convolutional layers are compressed and stored in the GPU memory.

17. A system, comprising:

a server node comprising;

graphics processing unit (GPU) resources comprising at least one GPU device and GPU memory, system memory configured to store program code; and at least one processor configured to execute the stored program code to perform a method comprising:

executing a deep learning task using the GPU resources, wherein the deep learning task is executed using a deep learning model comprising a plurality of functional layers that are processed in a predefined sequence;

wherein executing the deep learning task comprises:

invoking a current functional layer of the deep learning model, and processing, by the at least one GPU device, the current functional layer by using model data of the current functional layer to process output data generated by a previous functional layer; and in response to the invoking of the current functional layer, performing a plurality of operations during processing of the current functional layer, wherein performing the plurality of operations during processing of the current functional layer comprises:

accessing the model data of the current functional layer for processing by the at least one GPU device, the accessed model data of the current functional layer comprising decompressed model data of the current functional layer generated by a data decompression process performed on compressed model data of the current functional layer during processing of the previous functional layer prior to the invoking of the current functional layer;

during processing of the current functional layer, invoking a compression process and a decompression process;

during processing of the current functional layer, performing a data compression operation by the at least one GPU device using the invoked compression process to compress model data of the previous functional layer of the deep learning model and store the compressed model data of the previous functional layer in the GPU memory; and during processing of the current functional layer, accessing compressed model data of a next functional layer of the deep learning model from the GPU memory and performing a data decompression operation by the at least one GPU device using the invoked decompression process to decompress the compressed model data for subsequent processing of the next functional layer by the at least one GPU device in advance of invoking the next functional layer.

18. The system of claim 17, wherein the processing of the current functional layer, the data compression operation, and the data decompression operation are executed as separate processing streams by the at least one GPU device, and wherein the data compression operation and the data decompression operation are performed by loading and executing a compression kernel and a decompression kernel in the at least one GPU device.

19. The system of claim 17, wherein the at least one processor is configured to execute the stored program code to instantiate a memory manager which is configured to maintain metadata in the GPU memory, wherein the metadata comprises:
- a layer structure of the deep learning model, wherein the layer structure comprises an identifier of each functional layer in the deep learning model and information regarding the predefined sequence of the functional layers of the deep learning model;
- for each functional layer, data pointers to input data and output data of the functional layer stored in the GPU memory; and
- for each functional layer, an indication of a current state of the input data and the output data of the functional layer, wherein the current state comprises one of a compressed state, a decompressed state, and a ready state.

20. The system of claim 17, wherein the system comprises a cloud computing system which is configured to implement at least one service, wherein the at least one service comprises at least one of GPU-as-a-Service and Deep Learning-as-a-Service.

* * * * *